April 25, 1950 R. VILLEM 2,505,266

RADIOELECTRIC COMMUNICATION DEVICE

Filed June 17, 1947 3 Sheets-Sheet 1

INVENTOR:
RAYMOND VILLEM
By John B. Brady
attorney.

April 25, 1950 R. VILLEM 2,505,266

RADIOELECTRIC COMMUNICATION DEVICE

Filed June 17, 1947 3 Sheets-Sheet 2

INVENTOR:

RAYMOND VILLEM

By John B. Brady attorney

INVENTOR
RAYMOND VILLEM
By John B. Brady
attorney

Patented Apr. 25, 1950 2,505,266

UNITED STATES PATENT OFFICE 2,505,266

RADIOELECTRIC COMMUNICATION DEVICE

Raymond Villem, Paris, France, assignor to Societe Francaise Radio Electrique, a corporation of France Application June 17, 1947, Serial No. 755,038
In France May 12, 1944

Section 1, Public Law 690, August 8, 1946
Patent expires May 12, 1964

2 Claims. (Cl. 250—6)

My invention relates to improvements in radio electric communication systems.

It is well known that in short wave radio communications the waves arrive at the receiver in separate narrow beams angularly distant over sufficient degrees for being easily differentiated by means of aerials offering a marked directivity in the vertical plane. To each of those beams correspond a certain number of reflections of the waves between the earth and the high atmosphere, the smallest slope of the said beams corresponding to the most important ones, i. e. to those which have undergone the least number of reflections. Thus are found experimentally two, and sometimes 3 main beams the times of propagation of which differ by 500 or even 1,000 microseconds, and which undergo a slow change with the time.

It must be understood that if one common aerial simultaneously receives two beams presenting such time or phase differences, a selective fading will take place and affect the frequencies of the voice spectrum which are essential for the intelligibility of the speech. Thus a difference of time of 1,000 microseconds, which corresponds to a difference of one period for a frequency of 1,000 cycles per second, will result in a phase opposition for a frequency of 500 cycles per second, and consequently in a total fading of the said frequency if the two components have the same amplitude. It can moreover be observed that the lag or lead thus created will practically affect all the values comprised between zero and the above quoted figures, not only on account of the differences existing in the slope of the beams, but also on account of the difference in propagation times inside of one beam, though the effect of the latter variation is much lower than the effect of the interbeam difference in slope, being generally limited to 200 microseconds.

It therefore results that if we collect in the same receiver, simultaneously, some waves offering a maximum lag or lead amounting to 1,000 microseconds between the waves of two extreme beams, there will actually take place a selective fading which can affect all the frequencies of the voice spectrum exceeding 500 cycles per second.

My invention has for object some means for automatically avoiding the selective fading resulting from the phase difference between the waves belonging to different beams. The principle of the system consists in using one separate receiver per beam and combining in the same circuit the output currents issuing from the different receivers after having introduced automatically the phase differences apt to compensate the differences existing between the waves of the various beams.

My invention will be more clearly understood from the specification hereinafter following by reference to the accompanying drawings, in which.

Figure 1:
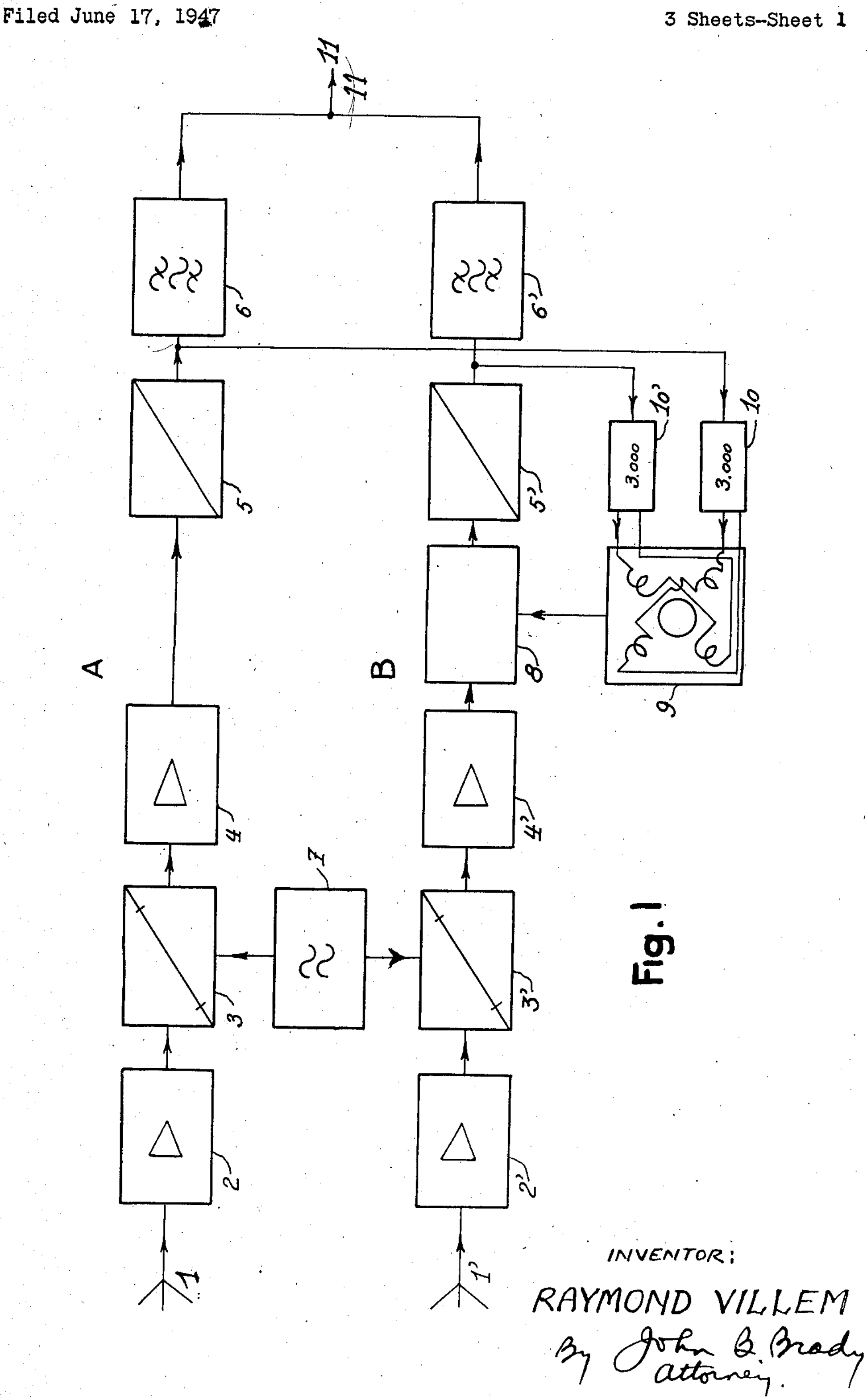
Figures 1 and 1A represent diagrammatically the installation as a whole.

For a better understanding of the features of the invention will be described, for explanatory purpose but not limitatively, a concrete instance in which the voice spectrum to transmit extends from 250 to 2,750 cycles per second.

On the transmission side, the wave corresponding to that spectrum will be, according to the invention, modulated by a frequency placed outside the voice spectrum, for instance equal to 3,000 cycles per second. This arrangement has been diagrammatically shown in Fig. 1A where a transmitter 25 operating on an aerial 26 is modulated on a low-frequency stage 27 whose input is simultaneously excited by a 3,000-cycle generator 28 and by a speech spectrum coming from the microphone 29 through a filter 30 for passing a 250–2750-cycle band. If, for more precision, I intend to receive two separate wave beams: either by means of two aerials with proper vertical directivity separating and isolating each one of the beams, or by means of a multiple system of orientable aerials; the receiving side will have to correspondingly include two receiver groups arranged as shown in A and B for instance in Fig. 1.

The receiver A is supposed to collect the most inclined beam (or the highest slope beam to which corresponds the longest course). The waves collected by aerial B are therefore leading the waves collected by the reeciver A.

Figure 1A:
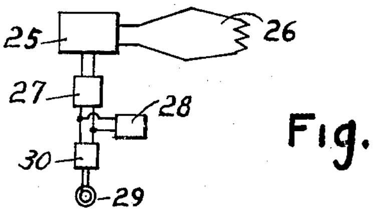

Fig. 1 shows the normal elements of each one of the receivers; and they are, enumerated in the order of their location, represented as follows: aerials 1 and 1' carrying indication of the diagrams of directivity in the vertical plane, which diagrams show that the beam received by 1 is more inclined than that received by 1'; high frequency amplifiers 2 and 2'; frequency changers 3 and 3'; modulated by heterodyne 7; mean frequency amplifiers 4 and 4'; low frequency detectors 5 and 5'; terminal filters 6 and 6' for frequency range 250 to 2,750 cycles per second; and finally the utilization circuit 11.

According to my invention, a retardation device for the currents is introduced, in 8, in the receiver B collecting the beam which is leading on the beam collected by receiver A; two filters 10 and 10' separate the currents of frequency 3,000 and direct them into an astatic phase-meter 9 which alters the constants of the retardation device 8 in order to vary the propagation time of the current through it.

The above described system works as follows: The retardation device 8 is adjusted in such a way that it introduces a lag approximately equal to the one which corresponds to the time difference between the beams respectively collected by the receivers A and B. Then the currents of frequency 3,000 issuing from filters 10 and 10' are approximately in phase and reach the phase meter 9 which acts on the retardation device 8. The said action lasts till the currents of frequency 3,000 are exactly in phase i. e. till the moment when the components of the useful spectrum of range 250 to 2,750 cycles per second issuing from the receivers and entering the utilization circuit 11 are equally in phase. If meanwhile the difference between the propagation times of the beams receive undergoes a variation, the same will occur with the phase of the currents of frequency 3,000, which then act through the intermediary of the phase meter 9 on the retardation device 8 till the difference be compensated, so as to bring into phase the currents of frequency 3,000 and consequently the components of the useful spectrum: so that an automatic phase regulation results therefrom. But it is essential, that the said regulation be perfectly astatic; or if, in other terms, for reasons of propagation, a fading of the received spectrum takes place, the retardation device 8 must remain set in the same conditions as before the fading of the spectrum. To that effect, there can be for instance utilized two pairs of windings 31 disposed 90 degrees apart, each one being fed by the currents of frequency 3,000. Thus will be created a rotary field revolving in one or the other direction according to the nature (lag or lead) of the currents of frequency 3,000. A short-circuited ring 32, fixed on the shaft, will rotate in the direction of the fields and will come to rest when the two components are in phase. It is also possible to adopt the use of known phase meters often described with reference to the control of the high frequency heterodyne of the one-band receivers.

Generally the phase meter 9 which receives the currents of frequency 3,000 ends on a terminal shaft which comes to rest when those currents are in phase and rotates in one or the other direction according to the respective phases of the currents; the said shaft will, moreover, control the devices which obtain the desired lag.

In what more particularly concerns the retardation device 8, it can be made in any known way, for instance by means of an artificial line closed on its characteristic impedance, and made out of cells each one of which includes one series self inductance and one shunt capacity.

The devices built for carrying out my invention may comprise various arrangements, namely with regard to the forms and locations of their components; for indicative purpose and not limitatively, a few of them will be hereafter described as representative of the ones I prefer.

In a first form of realization of my invention, for instance, the retardation device is included in the intermediate frequency circuits of the receiver B. Its self inductances and capacities are variable so as to allow a modification of the time of propagation, their movable parts being attached to the shaft of the phase meter. Use will be made, namely, of coils provided with divided iron cores which offer the possibility of obtaining very important variations of the self inductance coefficient. It will be of advantage, moreover, to change the capacity and the self inductance in the same ratio, in order to keep the same characteristic impedance at every moment.

Figure 2:
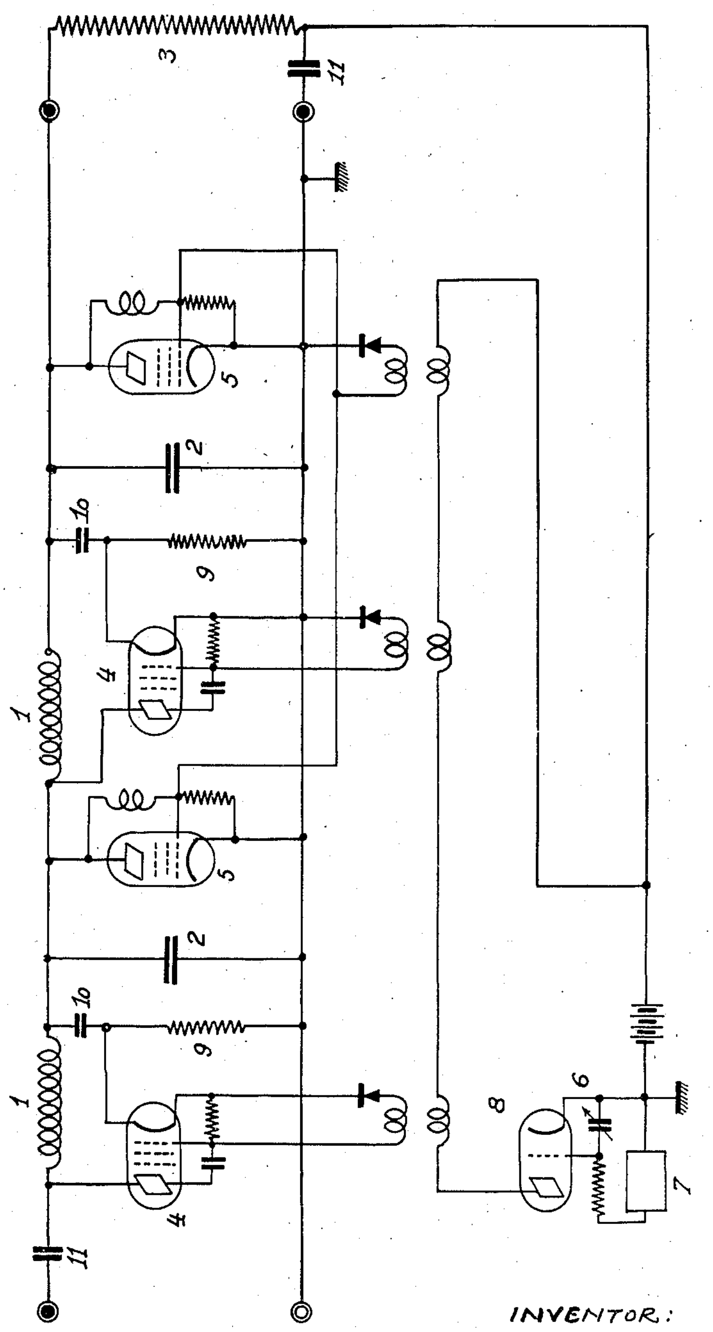
Fig. 2 represents in detail the correcting circuit of Fig. 1.

The phase meter 9 can also act on the retardation device through the intermediary of reactance tubes or valves shunting the elements of the latter. Fig. 2 shows, for indicative purpose and not limitatively, the details of the block 8 of Fig. 1 comprising for example two cells of the retardation device equipped according to this form of realization of the invention.

The fixed elements of those two cells are, on one hand, the inductances, series connected in 21, and on the other hand the capacities, shunt connected in 12; their characteristic impedance $$Z_0=\sqrt{\frac{L}{C}}$$

being represented in 13. The reactance tubes 14 act in order to change the value of self inductances 21 while the reactance tubes 15 are intended for changing the value of the capacities 12. The suppressor grids and the screen grids are connected in the usual way; for the sake of simplicity I have not shown in Fig. 2 the connections of those grids and I have also omitted the heating circuits of the indirectly heated cathodes of the tubes. Each tube or valve such as 14 in that Fig. 2 represents a capacity shunting the corresponding self inductance 21; and each tube such as 15 represents a self inductance shunting the corresponding capacity 12'.

The whole of that device is combined in such a way that, when I reduce the D. C. voltage applied between grid and filament of the reactance tubes for increasing the slope, the total series impedance and the total shunt impedance vary in the same direction for the frequency band ranging from $f1$ to $f2$ of the spectrum of the signal currents through the device.

In the case of the connection diagram of Fig. 2: The apparent capacity of every tube 14 is C' = R. C. S., where R represents the resistance between filament and control grid, C the capacity between plate and control grid, and S the slope of the tube. The apparent self inductance of each tube 15 is $$L'=\frac{L}{R.S}$$

where R is the resistance between filament and control grid, L the self inductance connected between plate and control grid of the tube and S the slope of the tube.

Figure 3:
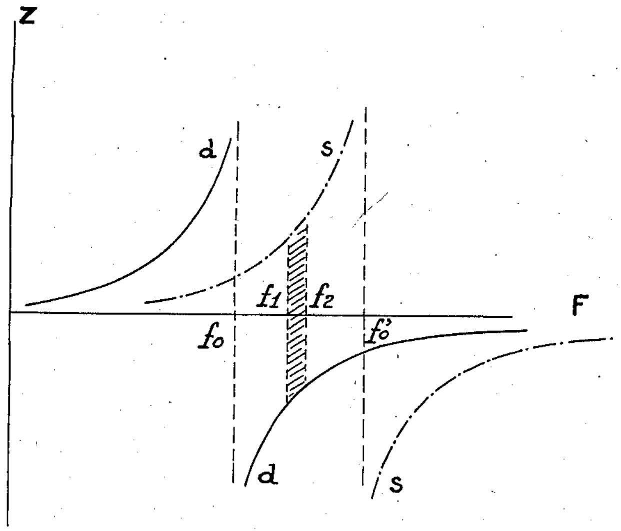
Fig. 3 represents an impedance variation diagram of the correcting circuit.

The above expressions show that an increase of the slope of reactance tubes result in an increase of C' and a reduction of L'. In order that the total series impedance and the total shunt impedance increase with regard to the frequencies of the signal spectrum, it will be necessary that the respective frequencies $f0$ and $f'0$ of the shunt impedance and of the series impedance be placed, with reference to the frequencies $f1$ and $f2$ limiting the spectrum of the signal currents, as shown in Fig. 3, in which the curves $d$ show how vary with the frequencies the impedance of the shunt connected elements, while the curves $s$ show the same variation for the series elements in function of the frequencies. It appears, indeed, that an increase of the slope results in an increase of the capacity C′ shunting the self inductance L, while $f'0$ decreases and comes nearer $f2$, so that the impedance of the series branch increases for the signal currents; there results also a reduction of the self induction L′ shunting the capacity C, while $f0$ increases, so that the impedance of the shunt branch increases also for the signal currents.

In order to modify, by means of the phase meter, the D. C. voltage between grid and filament of the reactance tubes with the minimum of friction, the control of the operating means is made as follows:

The phase meter operates the variable condenser 16 of Fig. 2, which acts as a potentiometer on the voltage of a high frequency generator 17. The variable high frequency voltage issuing from valve 18 is then applied to detecting circuits 24 connected to the space grid-cathode of the different reactance tubes. High resistances 19 and capacities 20 serve to fix up the cathode potential of tubes 14; and blocking condensers 22, of high capacity also, allow the feeding under D. C. voltage of the source 23 of the various reactance tubes 14 and 15.

The diagram shown in Fig. 2 represents one of the many combinations which can be used; and it offers the peculiar advantage to allow an easy working of the retardation device with a constant characteristic impedance, and in the same time it realizes important differences in the times of propagation through the retarding device while using only but a low number of cells in the said device.

Reactance tubes may also be used in such a way that they correspond to capacities shunting the self inductances 21 and capacities 12, or that they only react on either the former alone, or on the latter exclusively. When they act only on the capacities, a variable characteristic impedance must be provided, and its control be made by the phase meter. That characteristic impedance will then consist, either of a simple variable tap resistance, or for avoiding the friction, of the resistance of space-filament-plate of a tube, the grid tension of which is controlled by a capacitive potentiometer similar to the one shown in Fig. 2 which controls the grid potential of the reactance tubes.

In a second form of realization of my invention, the retardation device is included in the low frequency circuits of the receiver B. In that case, the phase meter operates, for instance, a multiple contacts commutator, which controls the operation of the relays serving to cut in or cut out as many cells of the device as is wanted at any time.

Figure 4:
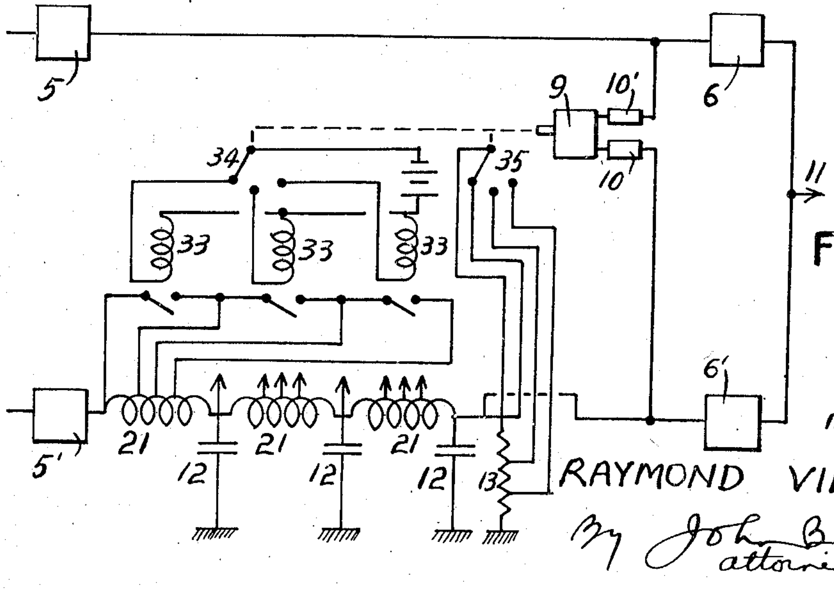
Fig. 4 represents a modified form of the invention in Fig. 1.

As the commutation by bounds or steps thus obtained is accompanied only by a small amplification, it can be effected without becoming audible in the utilization circuit. This modification is represented in Fig. 4 where the reference characters 5, 5′, 6, 6′, 9, 10, 10′, 11, 12, 13, 21 designate the same elements as in Figs. 1 and 2. The portions of the induction coils 21 are short-circuited by contacts actuated by relays 33 whose circuits are closed by the commutator 34 actuated by the phasemeter 9. The same phasemeter actuates a commutator 35 which short-circuits portions of the resistance 13 in order to adapt the impedance characteristics of the line to the variable values of the induction coils 21.

Whatever may be the forms of realization adopted, the dispositions outlined in my invention apply particularly well to the one band receivers: in which case the frequency of regulation (considered above as being equal to 3,000 cycles per second as a mere instance) may be drawn from the wave which serves in those receivers, for the regulation of the high frequency heterodyne and the final demodulation. Indeed that pilot wave stands always very near the transmitted spectrum and consequently reappears after the demodulations made at the reception. The said wave can therefore be efficacely utilized for operating the phase regulation which has been explained in the above paragraphs.

Now, the Fig. 1 relative to the phase regulation between two beams may clearly be extended to the case of a larger number of beams between which it is desirable to effect such a regulation. It is then sufficient to dispose of supplementary groups of receivers, and to include a retardation device in each of the receivers collecting the beams which have the greatest lead.

The retarding devices of each one of the said receivers are operated respectively by a separate phase meter receiving the supplementary modulation currents issuing, on one hand from the receiver collecting the beam of maximum lag, and on the other hand from the receiver on which operates the phase meter considered.

In other respects, I have supposed in connection with Fig. 1 that the regulation was made by means of a frequency issuing from the final demodulation of the receiver. It is obvious that, the case of a receiver having several successive stages of demodulation, it will be possible to place the regulation at the close of any one of the successive stage demodulations for acting on the whole of the converging stages, that case still being within the scope of my invention.

What I claim is:

1. In a system of radiotelephonic communication on short waves, a transmitter provided with means for simultaneously modulating short wave by a radiotelephonic communication and by an auxiliary frequency external to the spectrum of the said communication, a combination of receiving aerials oriented for receiving each a beam of waves emanating from the said transmitter with a different vertical inclination, and at least two receivers cooperating each with a different aerial, the circuit of the receiver assigned to the less inclined beam being equipped with a delay line composed of induction coils shunted by variable capacities and of capacities shunted by variable induction coils, the said variable capacities and induction coils being constituted by electronic valves mounted as variable reactances, a phasemeter controlled by the phase difference of the said auxiliary frequency energy in the respective beams, and means for controlling said reactance valves by a voltage delivered by said phasemeter, in such a way as to maintain constant the impedance characteristic of the delay line and to vary its propagation constant for the purpose of compensating the difference of propagation between the beams.

2. A system of radiotelephonic communication on short waves as set forth in claim 1, comprising a high frequency generator, means for rectifying the current of the said generator, means for controlling the reactance valves by the said rectified current, and means for controlling the output of this generator by the phasemeter.

RAYMOND VILLEM.

REFERENCES CITED

The following references are of record in the file of this patent:

UNITED STATES PATENTS

| Number | Name | Date |
|---|---|---|
| 956,165 | Pickard | Apr. 26, 1910 |
| 1,954,898 | Stone | Apr. 17, 1934 |
| 2,042,831 | Crosby | June 2, 1936 |
| 2,363,644 | Katzin | Dec. 1, 1944 |
| 2,375,126 | Mathes | May 1, 1945 |

FOREIGN PATENTS

| Number | Country | Date |
|---|---|---|
| 528,061 | Great Britain | Oct. 22, 1940 |
| 543,602 | Great Britain | Mar. 5, 1942 |